Oct. 22, 1957 — E. M. BOWEN — 2,810,326
WORK HOLDER
Filed Oct. 17, 1955 — 3 Sheets-Sheet 1

INVENTOR.
Earl M. Bowen
BY
Carlson, Pitzner, Hubbard & Wolfe
ATTORNEYS

Oct. 22, 1957     E. M. BOWEN     2,810,326
WORK HOLDER
Filed Oct. 17, 1955     3 Sheets-Sheet 2
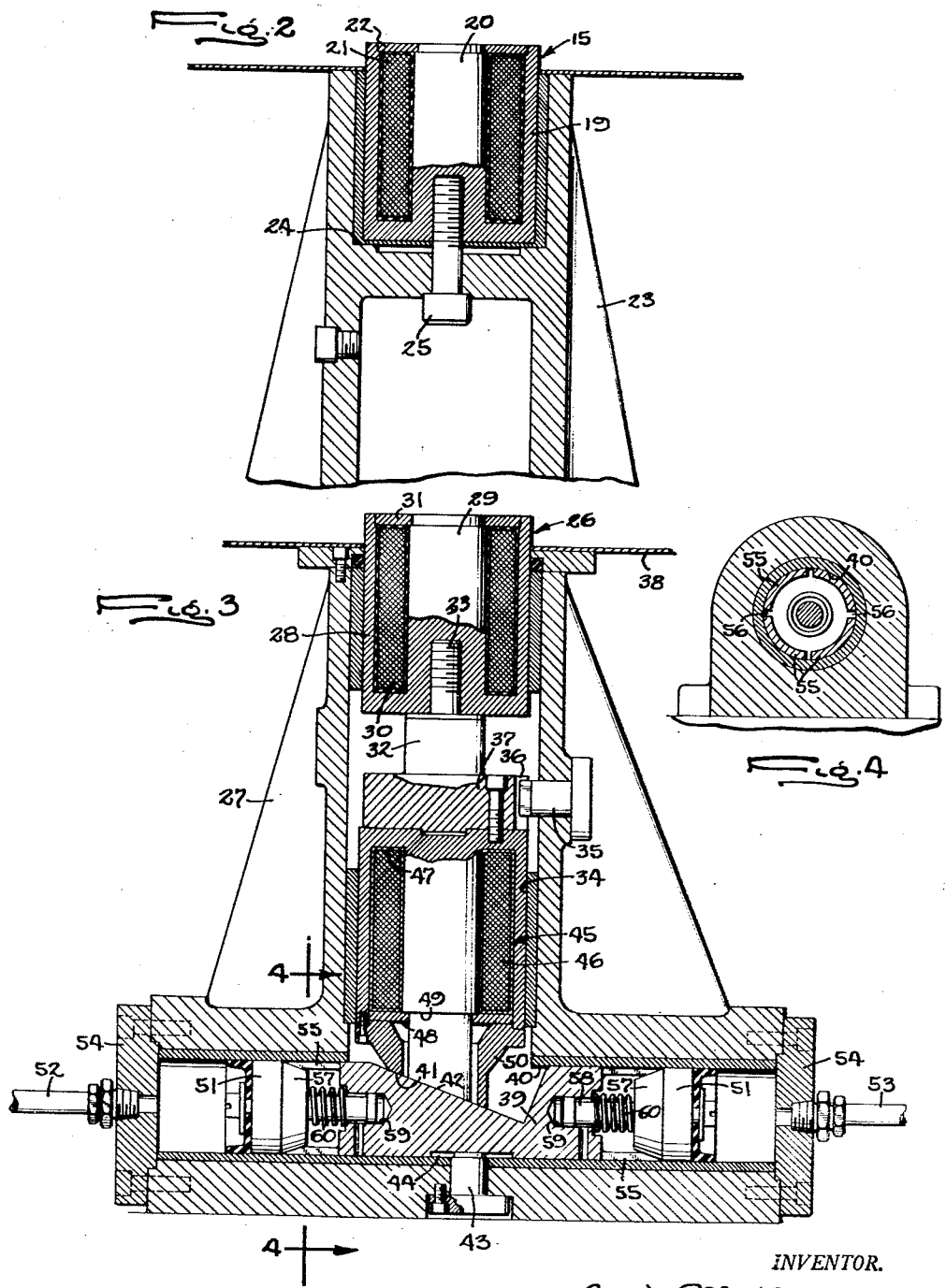
INVENTOR.
Earl M. Bowen
BY
Carlson, Pitzner, Hubbard & Wolfe
ATTORNEY Oct. 22, 1957   E. M. BOWEN   2,810,326
WORK HOLDER
Filed Oct. 17, 1955   3 Sheets-Sheet 3
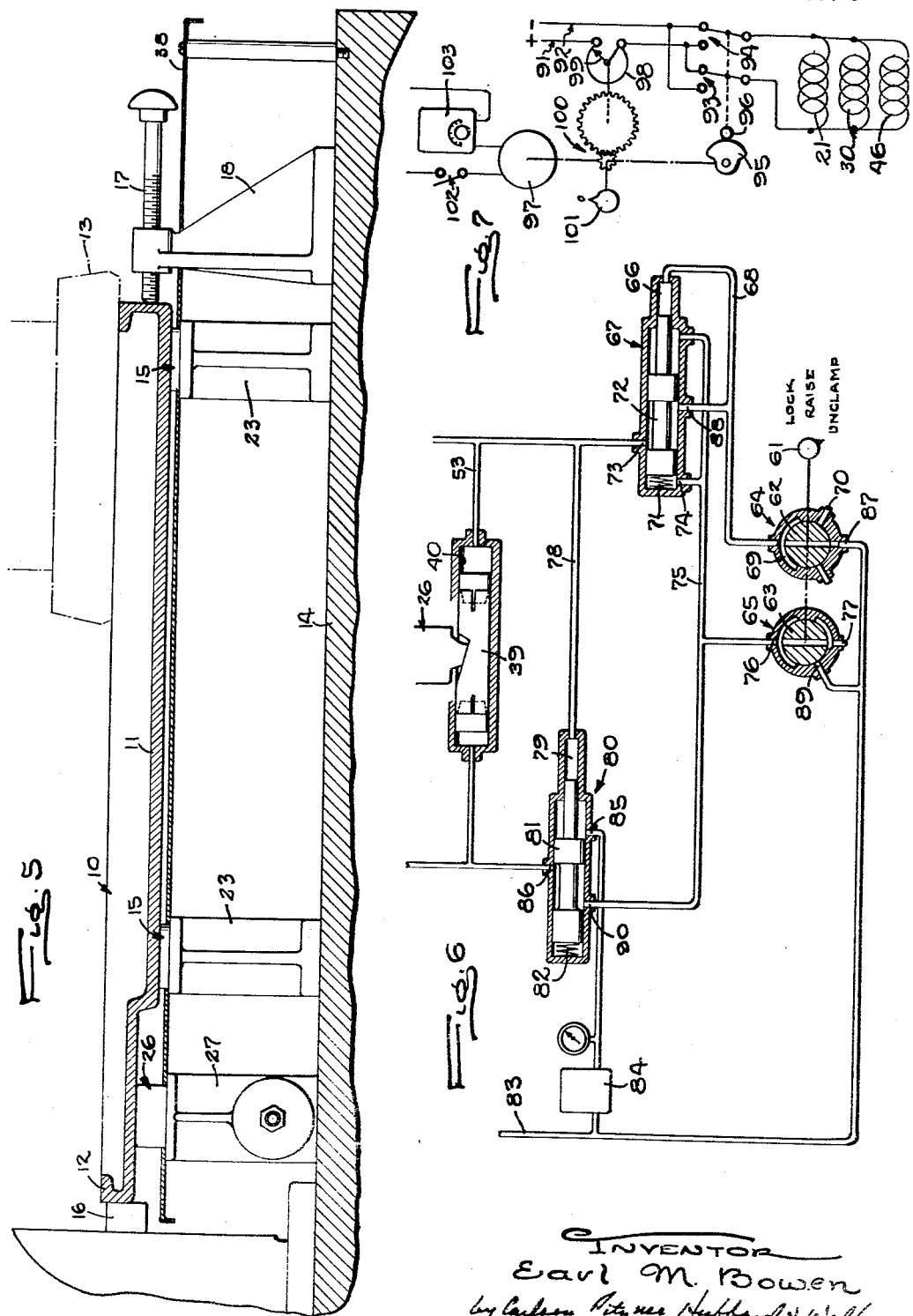
INVENTOR
Earl M. Bowen
by Carlson, Pitzner, Hubbard & Wolfe
ATTORNEY United States Patent Office 2,810,326
Patented Oct. 22, 1957

2,810,326

WORK HOLDER

Earl M. Bowen, Rockford, Ill.

Application October 17, 1955, Serial No. 540,703

6 Claims. (Cl. 90—59)

This invention relates to a chuck or a holder for receiving a workpiece and supporting the latter in a predetermined position while the piece is being machined or otherwise worked on. More particularly, the invention relates to a holder in which the workpiece is supported on a plurality of stationary abutments while other abutments are moved into engagement with the workpiece so that all of the abutments firmly engage the work even though the latter is irregular in shape. In such a holder, the abutments are provided with electromagnets which magnetically hold the workpiece in place.

The general object of the invention is to provide a new and improved workholder of the above character in which, as compared to prior holders, the workpiece is held more rigidly.

Another object is to provide a novel means for backing the adjustable abutments so that in any position of adjustment these abutments are rigidly backed and thereby solidly support the workpiece.

A more detailed object is to utilize a wedge in a novel manner for moving the adjustable abutments and to employ the wedge as the backing member for the abutments.

The invention also resides in the provision of novel means for locking the wedge in place after the adjustable abutments have been moved into engagement with the workpiece.

Other objects and advantages of the invention will become apparent from the following detailed description taken in connection with the accompanying drawings, in which Figure 1 is a fragmentary plan view of a workholder embodying the novel features of the present invention.

Fig. 2 is a fragmentary sectional view taken along the line 2—2 in Fig. 1.

Fig. 3 is a sectional view taken along the line 3—3 in Fig. 1.

Fig. 4 is a fragmentary sectional view taken along the line 4—4 in Fig. 3.

Fig. 5 is a fragmentary sectional view taken along the line 5—5 in Fig. 1.

Fig. 6 is a schematic view of a pneumatic control used to move the wedge.

Fig. 7 is a wiring diagram of a portion of the control circuit.

Figure 1:
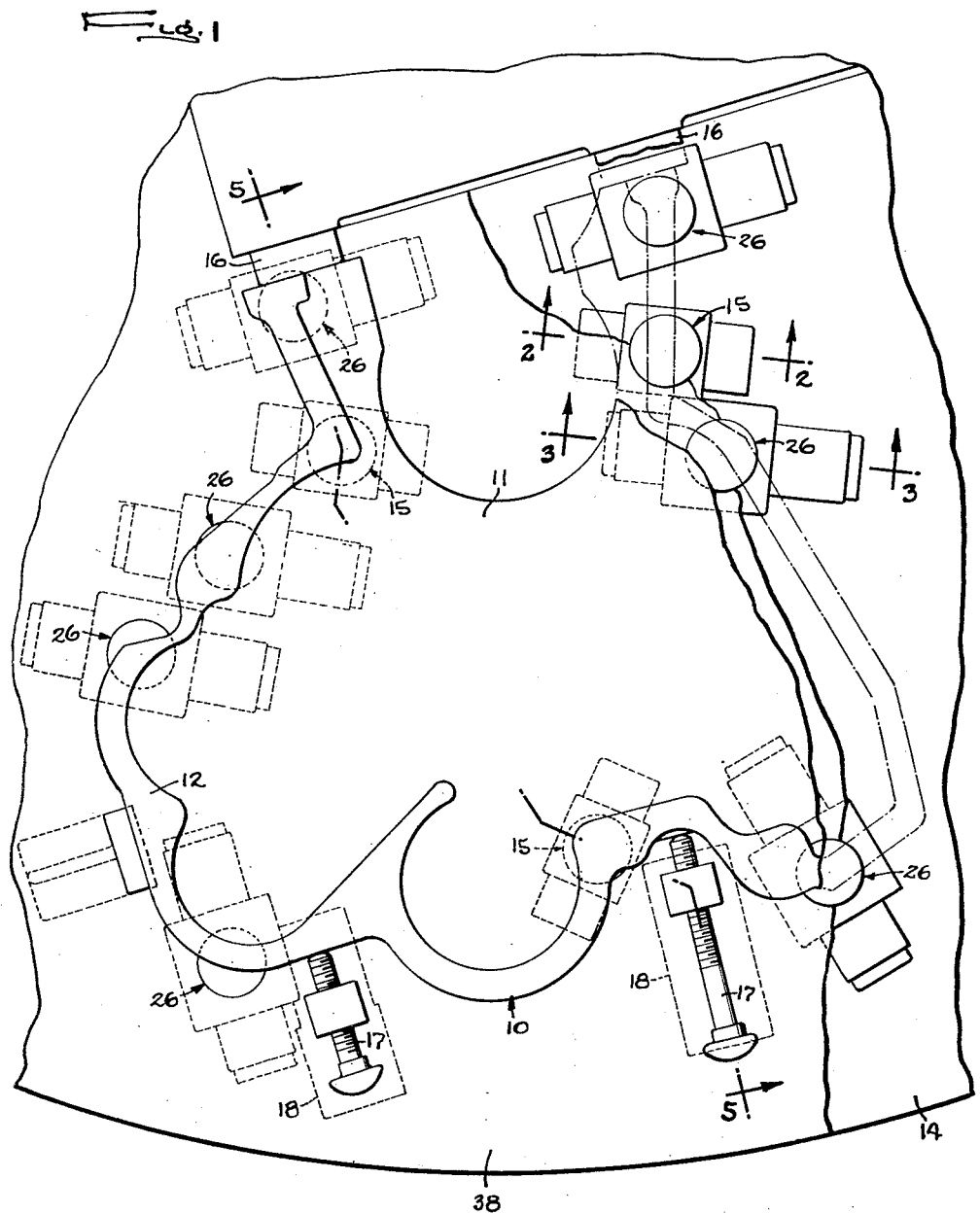

As shown in the drawings for purposes of illustration, the invention is embodied in a work holder for supporting and backing a workpiece 10 while a surface of the latter is being machined. Herein, the workpiece is composed of a magnetic material such as steel and is formed with an irregularly shaped body 11 and an upstanding peripheral flange 12. The face of the flange is to be machined and this may be performed by a face mill 13 (Fig. 5) which is fed across the flange.

The work holder includes a support 14 (Fig. 5) in the form of an annulus which may constitute or be carried by a rotary work table. Projecting parallel to the axis of the annulus and from the end thereof are a plurality of studs 15 which form abutments bearing against the back of the workpiece 10 at a plurality of angularly spaced points so as to locate the work axially in a predetermined position. Herein, there are three such studs and they engage the bottom surface of the work. The work is located on the studs in the proper radial position by stops 16 against which the work is held by screws 17. The latter are threaded through brackets 18 on the annulus 14 and bear against the work.

The workpiece 10 is held on the holder magnetically and, for this purpose, the studs 15 are formed by electromagnets. Each magnet comprises an upwardly opening cup-like member 19 (Fig. 2) of magnetic material with a core 20 extending along the axis thereof. An energizing coil 21 encircles the core and the cup is closed by a ring 22 of nonmagnetic material pressed onto the shouldered upper end of the core. The magnet is supported in a hollow bracket 23 secured to the top of the annulus 14 and is held in place on an internal shoulder 24 on the bracket by a screw 25 threaded through a portion of the bracket and into the cup member 19. When the coil 21 is energized, magnetic flux threads a substantially closed path from the core 20 through the workpiece 10 and the cup 19 and back to the core thus holding the workpiece against the top of the magnet.

To provide a rigid backing for the workpiece 10 between the locating abutments 15 so that the work is not deformed by the axial pressure applied during the machining, a plurality of auxiliary abutments 26 are employed. These abutments are mounted on the annulus 14 at laterally spaced points and particularly under the portions of the workpiece requiring the most support such as under the flange 12. In order that the abutments 26 may support the work even when the latter has an irregular under surface, they are mounted to move toward and away from the work so that they may be shifted into engagement with the workpiece and adapt themselves to the contour of the latter. For this purpose, these abutments are in the form of plungers which slide parallel to the axis of the support 14 in brackets 27 (Fig. 3) secured to the support.

As in the case of the abutments 15, the abutments or plungers 26 also serve to hold the workpiece 10 on the support 14. To this end, the abutments 26 are formed in part by electromagnets. The latter are similar to the magnets 15 (see Fig. 3) and each comprises a cup 28, a core 29, an energizing winding 30 and a nonmagnetic ring 31. The cup is secured to the upper end of a stem 32 by a screw 33 and the stem is guided to slide in the bore 34 of the bracket 27 by a pin 35 which projects through the wall of the bracket and into a vertical slot 36 formed in a flange 37 on the stem. A horizontal plate 38 may be supported on top of the brackets 23 and 27 to enclose the latter, the magnets 15 and 26 projecting up through this plate for engagement with the work.

With the foregoing arrangement, the plungers 26 are retracted and the workpiece 10 is placed in position on the support 14 resting on the magnets 15, this position being determined by the stops 16 and screws 17. The coils 21 of the latter then are energized to hold the work in this position and, while the work is thus held, the plungers 26 are moved up against the underside of the work. Because the latter is irregular, the plungers are shifted different amounts. When all the plungers engage the work, the coils 30 are energized so that the work is supported by both the abutments 15 and 26.

In order that the movable abutments 26 firmly support the work 10, the present invention contemplates the provision of a novel means for rigidly backing each plunger in any position of adjustment. This means comprises a movable member 39 (Fig. 3) which is shifted so that, in any position of the abutment 26, it acts between the support 14 and the abutment. In this way, the member 39 rigidly backs the plunger and positively prevents the latter from retracting as the work is being machined. Preferably, the member also serves to move the plunger against the work, that is, the member is moved to shift the plunger up against the work and, when this condition is obtained, the member holds the plunger in position.

While the member 39 may be arranged to rotate, it is preferred to use a sliding member such as the wedge shown in the drawings. The wedge 39 slides back and forth in a horizontal cylinder 40 disposed beneath the plunger 26 whose lower end surface 41 is inclined and rests on the inclined wedge surface 42 formed on the central portion of the wedge. Thus, when the wedge is shifted to the right as viewed in Fig. 3, it lifts the plunger into engagement with the workpiece 10. Shifting the wedge to the left lowers the plunger away from the work.

The cylinder 40 in which the wedge 39 slides is mounted in the lower part of the bracket 27 and, through the medium of the latter, is rigid with the supporting annulus 14. In this way, the wedge rigidly backs the plunger 26 and, in turn, is rigidly backed by the annulus. As a result, the plunger provides a positive support for the workpiece 10. A stationary pin 43 projects through the bottom of the cylinder and into a slot 44 in the wedge to prevent the latter from turning thereby keeping the wedge surface 42 in full engagement with the surface 41.

To hold each plunger 26 down in solid abutting engagement with its wedge 39, a second electromagnet 45 is mounted on each plunger and serves to hold the surface 41 against the surface 42. The magnet 45 is formed by an energizing coil 46 disposed within a downwardly opening annular recess 47 in the stem 32. The lower end of the recess is closed by a nonmagnetic ring 48 which is clamped against a shoulder 49 on the stem by a tubular part 50 encircling the end portion and bolted to the stem. The inclined surface 41 is formed on the part 50 and this part is made of magnetic material so that it completes a flux path extending through the stem around the recess 47, through the wedge 39 and the part 50 and back to the stem.

Air under pressure is utilized to shift the wedge 39 back and forth in the cylinder 40. For this purpose, a piston 51 is disposed at each end of the wedge in the cylinder 40 and is connected to the wedge. Air is admitted to or exhausted from the cylinder through lines 52 and 53 which communicate with the interior of the cylinder through plates 54 which close the cylinder ends. The pressure of the air used to shift the wedge in the direction for raising the plunger 26 is regulated so that the force it exerts in lifting the plunger is less than the magnetic force holding the workpiece down on the three stationary abutments 15. Thus, the raising of the plungers does not lift the work out of its proper position as the plungers are moved up against the underside of the work.

Means is provided to lock the wedges 39 in position after the plungers 26 are against the workpiece to prevent the wedges from moving out of backing engagement with the plungers. Herein this means comprises elements 55 which are connected to the wedges and are expanded into frictional gripping engagement with the cylinders 40. As shown in Figs. 3 and 4, the elements 55 are short sleeves or rings projecting rigidly from the ends of each wedge and split longitudinally as indicated at 56.

Preferably, the pistons 51 are utilized to expand the rings 55. For this purpose, the pistons are capable of moving relatively to the rings and are formed with tapered ends 57 which project into the rings and engage mating internal surfaces on the latter. By moving the pistons into the rings, the rings are expanded against the inside of the cylinder 40. The pistons are guided for movement relative to the corresponding wedge by stems 58 projecting forwardly from the pistons and sliding in bores 59 formed in the ends of the wedge. Encircling each stem and acting between the wedge and the piston is a compression spring 60 which urges the piston out from within the ring 55. The spring 60 is designed to exert a force which normally prevents the air in the cylinder 40 from moving the piston into the ring and expanding the latter. Instead, the piston merely abuts the ring which thus transmits sliding movement to the wedge.

In order to expand the rings 55, air, which preferably is under a pressure higher than that used to slide the wedge, is admitted simultaneously to both ends of the cylinder 40. This causes the pistons 51 to move toward each other and thus enter the rings 55 which are expanded against the cylinder and frictionally hold the wedge against sliding.

The manner in which the work holder of the present invention is used will be understood from the following description with particular reference to Fig. 6 which shows the pneumatic control circuit for the air used to slide and lock the wedge 39. Fig. 6 illustrates the condition of the circuit as it is when the holder is ready to receive a workpiece, that is, all of the plungers 26 are retracted. Also, at this time the electromagnets 15, 26 and 45 are deenergized. A workpiece 10 then is placed on the three stationary abutments 15 and the screws 17 are tightened to move the work against the stops 16 and thereby locate the work properly.

With the workpiece located, the electromagnets 15 are energized by means of a conventional electrical control circuit, which will be described later, so that the work is held down magnetically on the stationary abutments. Next, a manual valve actuator 61 is turned to the "raise" position turning the rotary valve members 62 and 63 of valves 64 and 65. This opens the piston end 66 of a valve 67 to exhaust through a line 68 and the ports 69 and 70 of the valve 64. As a result, the spring 71 of the valve 67 shifts the valve spool 72 to the right connecting the right end of the wedge cylinder 40 with exhaust through the line 53, ports 73 and 74 of the valve 67, a line 75 and ports 76 and 77 of the valve 65. Also connected to exhaust through a line 78 and the valves 67 and 65 is the piston end 79 of a valve 80 whose spool 81 thus is shifted to the right by a spring 82. With the spool 81 shifted, air under controlled pressure is admitted to the left end of the wedge cylinder 40 from a suitable source (not shown) through a supply line 83, a pressure regulator 84 and ports 85 and 86 of the valve 80. This shifts the wedge 39 to the right until the plunger 26 is raised into engagement with the underside of the workpiece 10. All of the plungers 26 are raised in a similar manner at the same time.

With the plungers 26 up against the work 10, the electromagnets 26 and 45 are energized so that the work is held against the plungers and the latter are held against the wedges 39. Next, the valve actuator 61 is moved to the "lock" position. Air under pressure is admitted from the supply line 83 through the ports 87 and 69 of the valve 64 to the piston end of the valve 67 thus shifting the spool 72 to the left against the action of the spring 71. Air then is admitted from the valve 64 through the ports 88 and 73 of the valve 67 to the right end of the cylinder 40 and to the piston end of the valve 80, the spool 81 of the latter thus being shifted to the left against the action of the spring 82. With the spool 81 shifted, air is admitted to the left end of the cylinder 40 through the ports 89 and 76 of the valve 65 and the ports 90 and 86 of the valve 80. Thus, air acts against the pistons 51 at both ends of each wedge 39 forcing the pistons into the rings 55 which are expanded and lock the wedge. The workpiece then is ready to be machined.

When the machining is completed, the electromagnets for the stationary abutments 15 are deenergized as are the electromagnets 26 and 45 for the movable abutments and the valve actuator 61 is turned to the "unclamp" position. Air is admitted to the ports 87 and 69 of the valve 64 to the piston end of the valve 67 so that the spool 72 remains in the left position as illustrated. As a result, the air continues to be admitted through the ports 88 and 73 of the valve 67 to both the right end of the cylinder 40 and to the piston end of the valve 80 to hold the spool 81 at the left. The left end of the wedge cylinder now, however, is open to exhaust through the ports 86 and 90 of the valve 80 and the ports 76 and 77 of the valve 65. With air at the right end of the cylinder 40 and the left end exhausted, the wedge 39 is shifted to the left. The screws 17 may then be loosened and the work removed from the holder.

In order to reduce the residual magnetism, particularly in the workpiece 10, and thereby release the work from the abutments, the coils 21, 30 and 46 of the various electromagnets may be energized and deenergized by means of the control circuit shown in Fig. 7. The coils are connected in parallel across supply lines 91 and 92 through two single pole double throw switches 93 and 94. The latter are mechanically connected and, when thrown, cause a reversal of the current and hence of the polarity of the coils. The contact arms of the switches are moved back and forth to effect a repeated reversal by a cam 95 operating through a follower 96 and driven by a motor 97.

In the supply line 91 is a rheostat 98 whose movable arm 99 is turned by the motor 97 through gearing 100. The arm is reset manually to the position in which the resistance of the rheostat is a minimum by turning a knob 101 to "zero." The motor 97 is energized by closing a switch 102 and runs for a predetermined time under the control of a timer 103.

With the circuit described above, the coils 21, 30 and 46 are energized by turning the knob 101 to "zero." When it is desired to deenergize the coils, the switch 102 is closed to start the motor 97. The latter turns the arm 99 of the rheostat 100 increasing the resistance and decreasing the energization of the electromagnet coils until the timer 103 stops the motor. At the same time, the cam 95 moves the arms of the switches 93 and 94 back and forth thereby repeatedly reversing the current through the coils. This reversal combined with the progressive decrease in the energization of the coils substantially eliminates any residual magnetism. Thus, when the timer stops the motor, the workpiece may easily be removed from the abutments.

It will be observed that the work holder of the present invention provides a solid support for the workpiece 10 even though the latter is irregular in shape. The plungers 26 are rigidly backed by the supporting annulus 14 through the medium of the wedges 39 and thus they, in turn, rigidly hold the work. The wedges are held securely in place by the expanded rings 55 during the machining operation.

I claim as my invention:

1. A holder for a magnetic workpiece comprising a support, an abutment on said support against which said workpiece may be located in a predetermined position, a plunger mounted on said support for endwise movement into and out of abutment with the positioned workpiece, a wedge of magnetic material guided on said support to slide transversely of said plunger and cam the plunger toward and against the positioned workpiece, a power actuator selectively operable to move said wedge, and selectively operable means creating magnetic flux and causing the same to thread a substantially closed path through the abutting surfaces of said workpiece, said plunger, and said wedge whereby to hold such surfaces in rigid abutment.

2. A holder for a workpiece comprising a support, an abutment on said support engageable with said workpiece to locate the same in a predetermined position, a plunger mounted on said support for movement into and out of abutment with the positioned workpiece to provide a rigid backing therefor, said plunger coacting with the workpiece to provide a first magnetic flux circuit, a wedge guided on said support to slide transversely of said plunger and engageable therewith to cam the plunger toward and against the positioned workpiece, a power actuator selectively operable to move said wedge back and forth and to shift said plunger toward and away from the workpiece, said plunger coacting with said wedge to provide a second magnetic flux circuit, and selectively operable means for causing magnetic flux to thread said flux circuits whereby to draw the workpiece against said plunger and said plunger against said wedge.

3. A holder for a workpiece comprising a support, an abutment on said support for locating a magnetic workpiece in a predetermined position, a plunger mounted on said support for movement into and out of abutment at one end with the positioned workpiece to provide a rigid backing therefor, said plunger coacting with the workpiece to provide opposite magnetic poles having faces at said end adapted for abutment with the positioned workpiece, a wedge of magnetic material guided on said support to slide transversely of said plunger and engageable with the opposite end thereof to provide a rigid backing, a power actuator selectively operable to shift said wedge and move said plunger toward the positioned workpiece and bring said pole faces into abutment therewith, said plunger having opposite magnetic poles with faces abutting said wedge, and selectively operable means for causing magnetic flux to thread said pole faces, the workpiece and said wedge and thereby hold the workpiece and wedge magnetically in abutment with opposite ends of said plunger.

4. A holder for a workpiece comprising a support, an abutment for locating the workpiece in a predetermined position, means including a magnet adapted when energized to draw and hold the workpiece against said abutment, a plunger laterally spaced from said abutment and mounted on said support for movement relative thereto into abutment with the positioned workpiece, means including a magnet adapted when energized to draw the workpiece toward the end of said plunger and supplement the force of said first magnetic means in holding the workpiece in said predetermined position, a wedge engageable with and movable transversely of said plunger to cam the same toward said workpiece, a power actuator for said wedge adapted when energized to shift the wedge and move said plunger against the workpiece, and means for energizing said actuator to shift said wedge and, through said plunger, exert a force on the workpiece insufficient to move the latter away from said abutment.

5. In a work holder, the combination of, a support, a work engaging plunger movably mounted thereon, a wedge engageable with said plunger and movable transversely thereof to shift the plunger against the workpiece, said wedge being slidable back and forth along a guideway on said support, pistons slidable in said guideway and disposed at opposite ends of said wedge, said pistons having lost motion connections with said wedge, spring means urging said pistons outwardly away from the ends of said wedge, means for applying fluid at predetermined first and second pressure behind said pistons, gripping devices associated with the respective pistons and operable when activated to hold said wedge against movement in opposite directions respectively, cam means actuated by the respective pistons to activate said gripping devices in response to movement of the pistons relative to and toward said wedge, and means controlling the application of said first and second pressures to first shift the wedge and project said plunger against the workpiece and then shift said pistons to activate said gripping devices.

6. In a work holder, the combination of a support, a work engaging plunger movably mounted thereon, a wedge engageable with said plunger and movable transversely thereof to shift the plunger against the workpiece, said wedge being slidable back and forth along a guideway on said support, a piston slidable in said guideway and having a lost motion connection with said wedge, means urging said piston and wedge apart, a device responsive to movement of said piston toward said wedge to derive a force for holding said wedge against movement, and mechanism for applying a predetermined fluid pressure to said piston to shift the piston and wedge in unison and then apply a higher pressure to shift the piston relative to the wedge and activate said gripping device.

References Cited in the file of this patent

UNITED STATES PATENTS 2,479,584     Meyer     Aug. 23, 1949

FOREIGN PATENTS 733,919     Great Britain     July 20, 1955

OTHER REFERENCES

American Machinist, vol. 54, No. 20, pgs. 864–867, May 19, 1921.